US010789857B2

(12) United States Patent
Alcaide Dias et al.

(10) Patent No.: US 10,789,857 B2
(45) Date of Patent: Sep. 29, 2020

(54) NOTIFICATION DEVICE AND NOTIFICATION METHOD

(71) Applicant: FUSIO D'ARTS TECHNOLOGY, S.L., Valencia (ES)

(72) Inventors: Manel Alcaide Dias, Valencia (ES); Ángel Albiach Ruiz, Valencia (ES)

(73) Assignee: FUSIO D'ARTS TECHNOLOGY, S.L., Benisano (Valencia) (ES)

(*) Notice: Subject to any disclaimer, the term of this patent is extended or adjusted under 35 U.S.C. 154(b) by 0 days.

(21) Appl. No.: 15/763,587

(22) PCT Filed: Sep. 29, 2016

(86) PCT No.: PCT/ES2016/070687
§ 371 (c)(1),
(2) Date: Mar. 27, 2018

(87) PCT Pub. No.: WO2017/055667
PCT Pub. Date: Apr. 6, 2017

(65) Prior Publication Data
US 2018/0286279 A1    Oct. 4, 2018

(30) Foreign Application Priority Data

Sep. 29, 2015    (ES) .................................. 201531381

(51) Int. Cl.
*G09B 21/00*    (2006.01)
*H04M 19/04*    (2006.01)
(Continued)

(52) U.S. Cl.
CPC .............. *G09B 21/009* (2013.01); *G08B 1/08* (2013.01); *G08B 5/22* (2013.01); *H04M 19/04* (2013.01);
(Continued)

(58) Field of Classification Search
None
See application file for complete search history.

(56) References Cited

U.S. PATENT DOCUMENTS

| 6,377,925 | B1 | 4/2002 | Greene, Jr. et al. |
| 8,494,507 | B1 * | 7/2013 | Tedesco .................... A61F 4/00 434/112 |

(Continued)

FOREIGN PATENT DOCUMENTS

WO    2007007916 A1    1/2007

OTHER PUBLICATIONS

International Search Report (ISR) and Written Opinion (WO) dated Nov. 21, 2016 for International Application No. PCT/ES2016/070687.

(Continued)

*Primary Examiner* — Thomas S McCormack
(74) *Attorney, Agent, or Firm* — Ladas & Parry LLP

(57) ABSTRACT

An alert notification device includes a plurality of devices working together as a whole configured to capture sound events in a restricted surrounding environment being monitored by a user with hearing disability, wherein the alert notification device includes a portable output device configured to execute an alert notification application that analyses at least one match indicator signal received by output device itself, a source signal captured by a resource or a third-party application executed in output device, and, based on an alert notification profile selected by the user using the alert notification application itself and produces, by means of portable output device's own resources, an alert notification signal that is seasonally and visually adapted for the user.

7 Claims, 1 Drawing Sheet

(51) Int. Cl.
*G08B 1/08* (2006.01)
*G08B 5/22* (2006.01)
*G08B 13/16* (2006.01)
*H04B 1/3827* (2015.01)

(52) U.S. Cl.
CPC ........ *G08B 13/1672* (2013.01); *H04B 1/3827* (2013.01)

(56) References Cited

U.S. PATENT DOCUMENTS

| | | |
|---|---|---|
| 8,917,186 B1 | 12/2014 | Grant |
| 2006/0017558 A1 | 1/2006 | Albert |
| 2006/0167687 A1* | 7/2006 | Kates .................... G09B 21/00 704/235 |
| 2010/0223046 A1 | 9/2010 | Bucchieri et al. |
| 2013/0243227 A1* | 9/2013 | Kinsbergen ......... H04M 1/2475 381/314 |
| 2015/0221321 A1* | 8/2015 | Christian ............... G08B 17/10 700/94 |

OTHER PUBLICATIONS

Spanish Search Report (SSR) of counterpart ES201531381.

\* cited by examiner

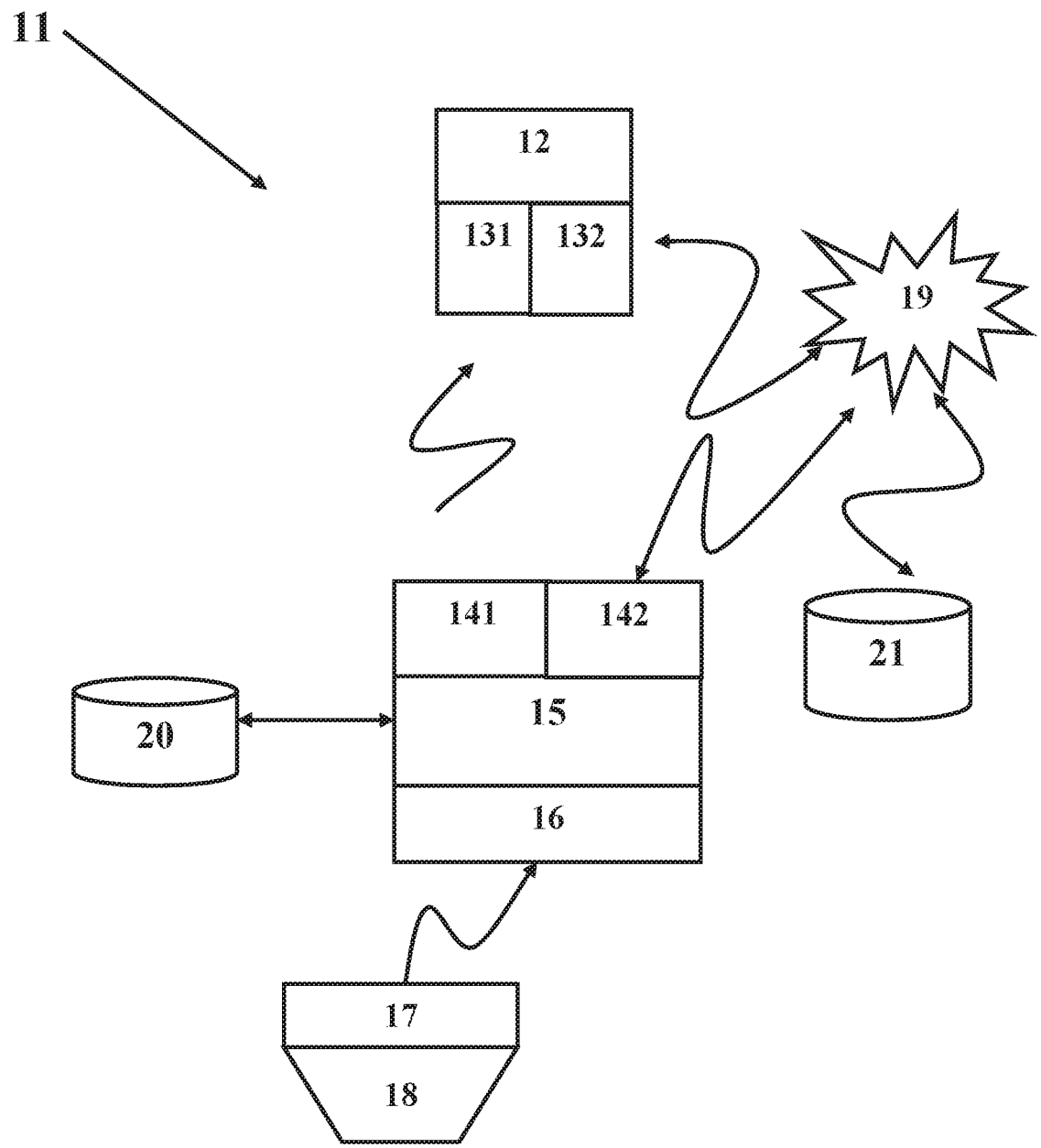

NOTIFICATION DEVICE AND NOTIFICATION METHOD

This application is an application under 35 U.S.C. 371 of International Application No. PCT/ES2016/070687 filed Sep. 29, 2016, which claims the benefit of Spanish Application No. P201531381 filed Sep. 29, 2015, the entire contents of which are incorporated herein by reference.

OBJECT OF THE INVENTION

This invention relates to an alert notification system for the hearing impaired in response to a broad range of acoustic signals occurring in the environment surrounding the user.

BACKGROUND OF THE INVENTION

Systems capable of recognising a set of acoustic signals and of notifying a person with a hearing disability that a sound has been generated in the surroundings near the hearing-impaired person are known in the art.

The system affords deaf persons the opportunity to gain awareness of sound events in their immediate vicinity.

The system comprises a set of devices for capturing sounds that are deployed in an environment being monitored; these devices capture sounds that occur in the vicinity of the user with a disability.

The sound capturing device is in radio communication with a controller that receives a signal sent by the sound capturing device related to a sound event captured by that sound capturing device.

The controller is in radio communication with an alerting device that receives an alert notification signal emitted and sent by the controller when the signal received matches a sound signal stored in a database associated with the controller.

The controller compares the signal relating to the captured sound event received and the signals relating to target sound events stored in the database in real time to determine whether there is a match between the captured sound and a stored target sound event. When the controller identifies a match, it transmits an alert notification signal to an output device for the output device to notify the user of the captured sound event.

Therefore, to be able to notify the hearing-impaired user, it is necessary to have available a telecommunications network with radio channels. Radio channels may not always be available, and consequently non-availability of radio channels prevents a user with a hearing disability from being notified of a sound event occurring in the users vicinity.

SUMMARY

This invention seeks to solve one or more of the disadvantages set out above using a method and a device for notifying a hearing-impaired user of a sound event as defined in the claims.

The alert notification device comprises a plurality of devices working together as a whole configured to transduce certain ambient sounds captured in a restricted setting being monitored into multimedia content sensorially and visually adapted for a user with complete or partial hearing disability so as to notify the user of events that might concern him or her at any given time. The restricted setting being monitored is thus made safe for the hearing-impaired user, affording that user freedom and mobility.

The multimedia content furnished includes sign language multimedia content and notifies the user that a given target sound has occurred at a given location within the surrounding environment being monitored, i.e., the restricted setting.

The system includes at least one sound input device adapted for continuous real-time capture of sound events produced in the restricted surroundings being monitored by the user and for transmitting the captured sound events to a controller configured to register the sound event received and compare that sound event with a plurality of target sounds stored in a database; further, where there is a match between the captured sound event and one of the stored target sounds, the controller is configured to generate and transmit a match indicator signal to a portable output device, such as a wearable device, a portable smart device that receives the match indicator signal and emits, in real time, an alert notification signal sensorially and visually adapted for the user to make the user aware that a predetermined target sound has occurred in the vicinity at a given location in the restricted surrounding environment being monitored.

The controller effects a real-time comparison between the sound event captured by an input device and a plurality of target sounds stored in a database to determine whether there is a match between the captured sound event received and a stored target sound. Where there is a match, the controller transmits a pre-established match indicator signal to the users wearable output device to notify the user of the sound that has occurred at a givers location in the setting being monitored.

The controller comprises a digital signal processor, a wireless WIFI communications interface, and a telecommunications interface to establish communications with a telecommunications network such as the Internet, Ethernet, radio link, a combination thereof, or the like.

The sound input device comprises a microphone for capturing sound events that is also electrically connected to a wireless WIFI communications interface.

A plurality of sound input devices are distributed and placed near at least one biological and/or electromechanical sound source within the restricted environment being monitored by the user.

The portable output device is a portable smart device configured execute an alert notification application in the nature of a native application, a native web application, or the like written in the native language of the device, downloadable from a service provider's applications server inside the output device itself, such that by executing the alert notification application, the device is capable of receiving match indicator signals via a radio interface and/or a wireless WIFI communications interface to send the corresponding alert notification signal sensorially and visually adapted for the user and thus notify the user of the sound event captured in the surrounding environment being monitored.

The sound captured must be observed to originate within a restricted setting, but the user may receive the signal indicating a match either within the restricted environment and/or outside that environment.

Furthermore, the alert notification application is in communication with resources of the output device itself so as to be able to access different features of the device, such as an alarm, an alert message, a camera, GPS service, a loudspeaker, third-party applications executable by the device itself, e.g., a voice recognition application, WhatsApp, Twitter, or the like. The alert notification application captures different source signals that are supplied by the aforesaid resources and applications and received by the output device and adapted so as to supply at least one alert notification signal for a captured signal. The alert notification signal supplied is sensorially and visually adapted for a user with a disability at the same time as the source signal is adapted for notification to a user without any disability.

Since the alert notification application is designed directly for the output device software, the application's performance is optimised, along with a man-machine interface adapted for the operating system of the output device to which the user is accustomed, thereby yielding enhanced results as far as design, usability, and efficiency are concerned. The alert notification application may be disseminated using the output device's operating system's official download servers, thus ensuring full visibility and security.

Another advantage of the alert notification application is that it can be used without having to be connected to the Internet, though some of its parts may nonetheless require an Internet connection.

Consequently, the alert notification application for the portable output device is designed to capture a signal, alert, or multimedia message received by the portable output device via a resource and/or application pertaining to the device itself, to convert it so as to supply the corresponding alert notification signal in text form, sign language, vibration, colourimetry, or the like, sensorially and visually adapted for users with a hearing disability.

The stored target sounds comprise sounds in the nature of real sounds from mechanical sources like a doorbell, the ringing of an incoming telephone call, a multimedia message tone, a fire alarm, a security alarm, and electric appliance alarm, organic sounds like a child's crying, the drip of a tap, previously chosen words, predetermined phrases in the nature of voice commands, and the like.

BRIEF DESCRIPTION OF THE DRAWINGS

A more detailed explanation of the invention is given in the following description based on the attached FIGURE.

FIG. 1 schematically represents an alert notification device comprising a plurality of devices working together as a whole configured to transduce certain ambient sounds captured in a restricted environment that is being monitored into multimedia content sensorially and visually adapted for a user with complete or partial hearing disability.

DESCRIPTION

FIG. 1 depicts an alert notification device 11 comprising a plurality of devices 12 to 19 working together as a whole to capture ambient sound events and convert them into an alert notification signal, including multimedia content sensorially and visually adapted for a user to be interpreted by a user with complete or partial hearing disability.

The ambient sound events encompass multiple sounds occurring in a specific restricted setting that is being monitored. The sound captured originates within the restricted environment, but the user may receive the alert notification signal either within the restricted environment and/or outside that environment.

Alert notification device 11 comprises at least one wireless sound input device 18, a controller 15, and at least one portable output device 12.

Wireless sound input device 18 continuously captures, in real time, sound events occurring in the specific restricted environment being monitored by a user with partial or complete hearing disability and transmits, also in real time, an input signal relating to the sound captured over a first wireless interface 17 to a second wireless interface 18 contained in controller 15. In other words, the communications link between input device 18 and controller 15 is not established over a telecommunications network 19.

Sound input device 18 has a microphone electrically connected to a first WIFI-based, Bluetooth-based, or similar wireless interface 17, and at the same time the two units 18 and 17 are electrically connected to an electric power supply such as an electric grid, a battery, or the like.

Further, the second wireless interface 18 is in the nature of a WIFI or Bluetooth-based unit or the like.

The user may place sound input device 18 in different areas of a specific restricted environment being monitored to capture sound events occurring within a predetermined area of interest to the user.

A plurality of sound input devices 18 are arranged at a distance from each other and from controller 15 and may be placed near potential sound sources of interest to the hearing-impaired user, such as a door, a telephone, an electrical appliance, a smoke detector, a burglar alarm, or any other sources of biological or non-biological sounds, or in a general area where all these sounds and others may be detected.

Controller 15 receives the captured sound event in real-time and compares the sound event received to a plurality of target sounds recorded and stored in a database 20 connected to controller 15, also in real time, to search for a match between the sound received and the stored target sounds.

The recorded target sounds may be pre-recorded in database 20 at the place of manufacture, and it may be possible for the hearing-impaired user to add additional target sounds particular to the specific restricted environment being monitored in which input devices 18 are deployed, in consequence, once input devices 18 have been arranged in their working locations, a procedure to update the target sounds recorded in database 20 has to be performed. Accordingly, database 20 of target sounds should be updated periodically.

Controller 15 performs a step in which the sound received is compared to all the recorded target sounds stored in database 20 accessible from controller 15.

If the outcome of the comparison step is positive, controller 15 transmits a match indicator signal to portable output device 12 to notify that a sound of interest to the user is being produced in the hearing-impaired user's specific vicinity.

The match indicator signal is transmitted via a third wireless interface 141 and/or a fourth radio communications interface 142 establishing a radio communications channel in telecommunications network 19.

The radio channel is used when wireless communication between controller 15 and output device 12 is not feasible.

Portable output device 12 receives the match indicator signal in real time, and that signal is supplied to an alert notification application executed by output device 12 itself, to convert the match indicator signal into an alert notification signal sensorially and visually adapted for the user to facilitate recognition and cognisance that a sound event has occurred in the restricted environment being monitored by a user with a complete or partially hearing disability.

The output device comprises a fifth wireless interface 131 and a sixth communications interface 132 to receive match indicator signals from the controller's third wireless interface 141 and/or the fourth communications interface.

Portable output device 12 is a portable smart device in the nature of a wearable device, a portable smart device, or the like configured to execute a alert notification application in the form of a native application, a native web application, or the like written in the native language of device 12, such that by executing the alert notification application, device 12 is capable of receiving match indicator signals from controller 15 via radio interface 132 and/or wireless WIFI communications interface 131 and of converting them into the corresponding alert notification signal sensorially and visually adapted for the user to provide notification of the sound event captured in the surroundings being monitored.

Furthermore, the alert notification application is in communication with the resources of output device 12 to be able to access the different features of the native resources of output device 12 and other third-party applications executable by output device 12 so as to capture the various source signals supplied by the resources and applications, adapting them so as to supply the corresponding alert notification signal sensorially and visually adapted for a user with a disability at the same time as the source signal suitable for notification to a user without any disability.

The function of the executable alert notification application in output device 12 is to analyse at least one match indicator signal received, a source signal captured from a resource of output device 12 or a third-party application of output device 12, and based on the notification profile selected by the user using the match indicator signal and captured source signal alert notification application itself, produce an alert notification signal sensorially and visually adapted for the user, for example, by producing a vibration, causing an audiovisual screen to blink, producing a text message or pop-up window, any combination thereof, or the like, using portable output device's 12 own resources.

The alert notification signal indicates that a given sound event has occurred in the restricted environment being monitored by the user.

The alert notification application is downloadable from a service provider's application server 21 over a telecommunications network 19, where server 21 may be a push server, i.e., the alert notification application is transmitted to output device 12 from application server 21 without any prior request being sent from output device 12, for instance, over the Internet 19.

Each target sound is associated with a predetermined alert notification signal. Where a match is found, portable output device 12 immediately receives the corresponding match indicator signal so as to supply a predetermined notification signal associated with the match detected.

Thus, each sound event occurring in the restricted environment being monitored by the user and each signal produced by a resource and/or a third-party application executable by output device 12 may be associated with at least one alert notification signal activated by the alert notification application inside portable output device 12, thereby notifying the user of the captured sound event.

Portable output device 12 is sensorially and visually adapted to an alert notification signal by the alert notification application downloadable from application server 21 via telecommunications network 19 and executable by output device 12 itself. That is, for a given alert notification signal associated with a given type of sound event, e.g., a doorbell, the user may, using the alert notification application, select how the alert notification signal will be emitted by the audiovisual resources of output device 12 itself. For example, in the form of a vibration, a light effect, a text message, an explicit icon, etc., or a combination thereof.

This may naturally be done with or without vibration, but a vibration emitter may more readily attract the user's attention.

Controller 15 comprises a digital signal processor electrically connected to second wireless interface 16, third wireless interface 141, and/or the fourth communications interface to establish communications to and from telecommunications network 19 so as to have an Internet connection; second and first wireless interfaces 18 and 17 configured to establish wireless communications to and from sound input device 18 and portable output device 12; and database 20 where a plurality of target sounds are recorded and stored.

Controller 15 is in communication with application server 21 and portable output device 12 on telecommunications network 19, and controller 15 is in further communication with portable output device 12 over a wireless connection in the nature of WIFI, Bluetooth, or the like for purposes of sending and receiving information back and forth.

The operation, update status, etc. of controller 15 is supervised from application server 21 via a communications channel established over telecommunications network 19.

A cochlear implant is adapted to include a wireless interface electrically connected to the coil of the cochlear implant itself, such that the controller can transmit a match indicator signal to the cochlear implant, whereby the match indicator signal is transduced to supply the corresponding alert notification signal to the cochlear implant user.

The invention claimed is:

1. An alert notification device comprising a plurality of devices that work together as a whole, configured so as to capture sound events in a restricted surrounding environment being monitored by a hearing-impaired user, characterised in that the alert notification device (11) comprises at least one sound input device (18) to capture sound events and transmit, in real time, an input signal relating to the sound event captured to a controller (15) over a first and a second wireless communications interface (17,16) electrically connected to the input device (18) and to the controller (15), respectively, the controller (15) being configured to search for a match between the input signal received and, a plurality of target sound events stored in a database (20) and, where a match is found, the controller (15) is configured to transmit a match indicator signal to an output device (12) via a third wireless communications interface (141) and/or a fourth radio interface (142) to cause transmission of the match indicator signal to a cochlear implant adapted to include a wireless interface electrically connected to a coil of the cochlear implant itself to tray transduce the match indicator signal into a corresponds ng alert notification signal for the cochlear implant user.

2. A device according to claim 1, characterised in that portable output device (12) is configured to execute, within output device (12) itself, an alert notification application that analyses at least the match indicator signal received, a source signal captured by an application executed in output device (12), and, based on the alert notification profile selected by the user using the alert notification application itself, produce, using portable output device's (12) own resources, an alert notification signal that is sensorially and visually adapted for the user.

3. A device according to claim 2, characterised in that portable output device (12) executes an alert notification application downloadable from an application server (21) of a service provider inside output device (12) itself via a sixth radio interface (142) and/or a fifth wireless communications interface (131).

4. A device according to claim 3, characterised in that portable output device (12) comprises an alarm device, a monitoring device, an LED matrix, an audiovisual, screen, vibrating means, a radio transmitter, an ultrasonic transducer, a voice alert device, a visual warning device, or any combination thereof.

5. A device according to claim 3, characterised in that portable output device (12) is in the nature of a portable smart device, a wearable device, or the like.

6. A device according to claim 1, characterised in that the database is configured to store and update sound events that are biological or electromechanical in origin or command words or any combination thereof.

7. A device according to claim 1, characterised in that sound input device (18) is a microphone.

* * * * *